July 28, 1970  J. C. THOMAS  3,522,227
POLYMERIZATION OF VINYL CHLORIDE
Original Filed Feb. 19, 1964  4 Sheets-Sheet 1

INVENTOR.
JEAN CLAUDE THOMAS
BY
Bauer & Seymour
ATTORNEYS

July 28, 1970  J. C. THOMAS  3,522,227

POLYMERIZATION OF VINYL CHLORIDE

Original Filed Feb. 19, 1964  4 Sheets-Sheet 2

INVENTOR.
JEAN CLAUDE THOMAS
BY
Bauer & Seymour
ATTORNEYS

July 28, 1970  J. C. THOMAS  3,522,227
POLYMERIZATION OF VINYL CHLORIDE
Original Filed Feb. 19, 1964  4 Sheets-Sheet 4
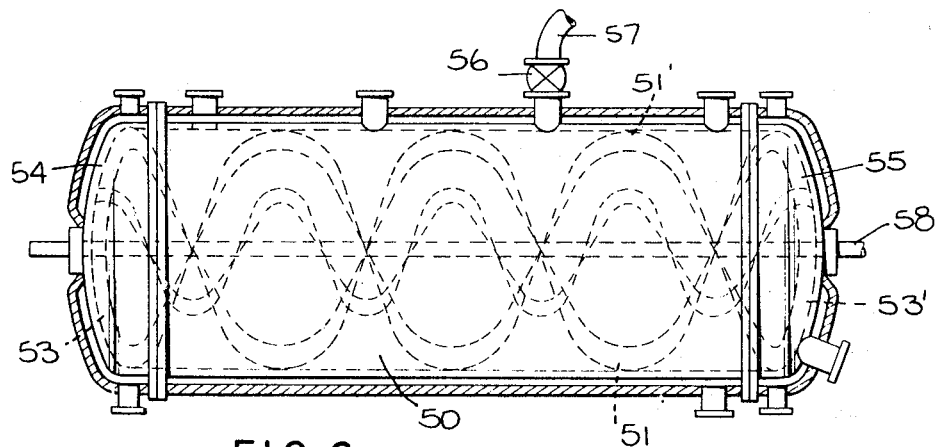
FIG. 6
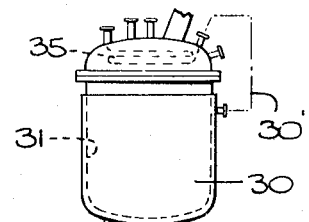
FIG. 7
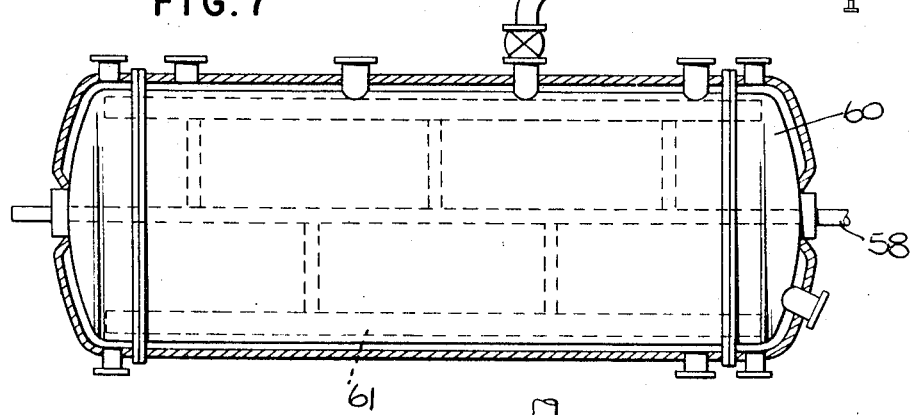
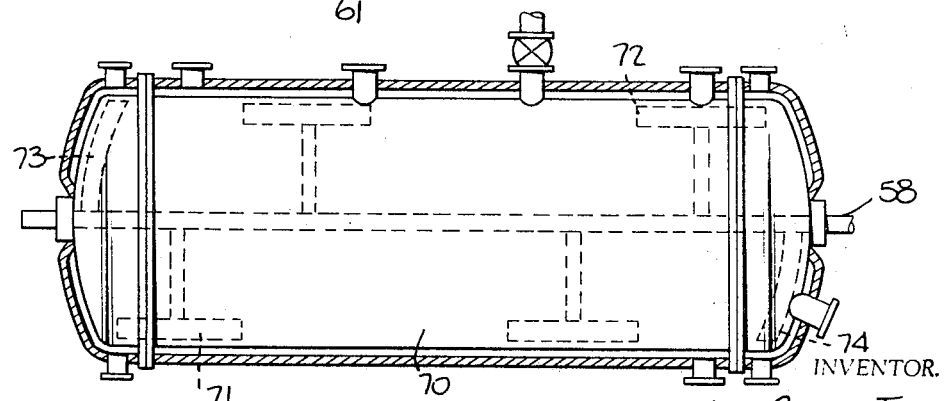
FIG. 8
INVENTOR.
JEAN CLAUDE THOMAS
BY
Bauer & Seymour
ATTORNEYS

United States Patent Office 3,522,227
Patented July 28, 1970

3,522,227
POLYMERIZATION OF VINYL CHLORIDE
Jean Claude Thomas, Lyon, France, assignor to Produits Chimique Pechiney Saint-Gobain, Neuilly-sur-Seine, France
Continuation of applications Ser. No. 345,944, Feb. 19, 1964, and Ser. No. 347,147, Feb. 25, 1964. This application June 11, 1969, Ser. No. 832,394
Claims priority, application France, Feb. 26, 1963, 926,043
Int. Cl. C08f 1/04, 1/10, 3/30
U.S. Cl. 260—92.8         9 Claims

ABSTRACT OF THE DISCLOSURE

Polymers and homopolymers of vinyl chloride are produced, such polymers and homopolymers being in the form of regular, substantially spherical grains. In the disclosed embodiments of the method, polymerization is carried out in mass, that is, in the absence of solvent or diluents, in two stages of which the first proceeds to only about 7 to 15% of completion with agitation of high turbulence, and the second proceeds to the selected end point with only mild agitation designed to maintain good heat exchange. In the preferred form of the invention the first stage is carried out in one autoclave and the second stage in another.

---

This application is a continuation of application Ser. No. 345,944, filed Feb. 19, 1964, and a continuation of application Ser. No. 347,147, filed Feb. 25, 1964.

This invention relates to the polymerization of vinyl chloride in mass, either singly or admixed with other monomers. As vinyl chloride is an important vinyl monomer the polymerization of which is accompanied by problems of special difficulty the invention will be described in its application to its homopolymerization and copolymerization in mass, that is to say, in the absence of solvents or diluents, a process which is difficult but produces a product possessed of exceptional properties.

In the manufacture of vinyl chloride by polymerization in mass the monomer is put under pressure, in an autoclave, sufficient to liquefy it, receives a catalyst, is mildly agitated, and is maintained at a temperature favorable to polymerization until some selected end point is reached, for example a point at which 60 to 70% of monomer has been polymerized, at which the polymerization is stopped and the product is isolated. The present invention uses the temperatures, pressures, catalysis and methods of purification of the prior art.

There are several types of autoclave which are used in the manufacture of polyvinyl chloride, for instance a fixed vertical cylinder with a paddle type of agitator, a fixed horizontal cylinder with a helical agitator, sometimes called a ribbon blender, a fixed horizontal cylinder with a straight blade agitator, one with short blades in opposed position, and one having a rotary horizontal cylinder.

These are diagrammatically illustrated in the drawings wherein:

FIG. 6 is similar to FIG. 5, showing a fixed horizontal, cylindrical autoclave of ribbon blender type, the preliminary autoclave being omitted from the drawing to conserve space;

FIG. 7 is similar to FIG. 5 except that the second autoclave is equipped with a stirrer of long paddle type; and FIG. 8 is similar to FIG. 5 except that the second autoclave is equipped with short blade stirrers which are oppositely and alternately disposed on the driven shaft.

It is an object of this invention to prepare polyvinyl chloride with improved granulometry.

It is an object of this invention to prepare a new and superior form of polyvinyl chloride, which is especially superior to the forms heretofore known in granulometry, being denser, of more homogeneous sizes, containing fewer extremely large and extremely fine sizes, and being especially superior in the regular spherical shape of its grains as it issues from the autoclave.

Another object is to produce polymers in mass by a method of superior technical and economic efficiency, to produce different grain sizes at will, to affect the density of the grains, and to achieve the improved results without substantially increasing, and even with a decrease in, the power consumed. A special object is to provide novel apparatus adapted to the preparation of the new products by the novel method. Other objects will appear as the description proceeds.

Figure 1:
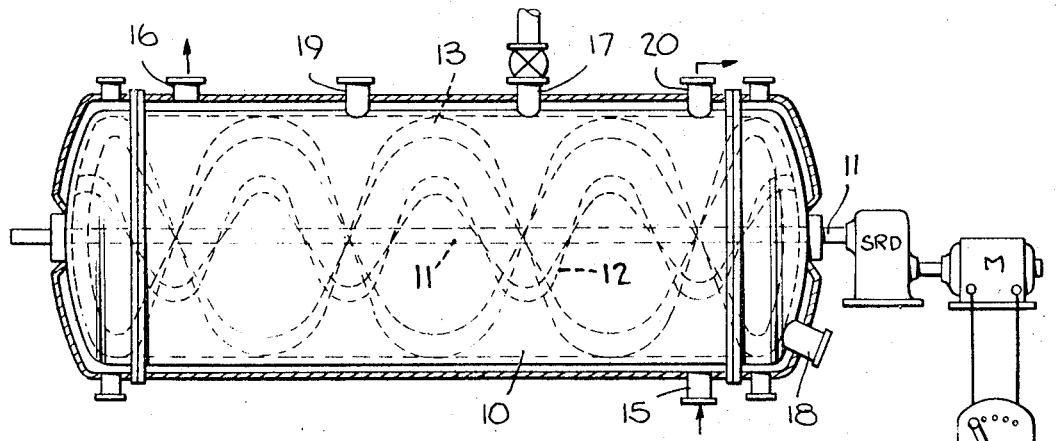
FIG. 1 is a vertical section through a horizontal cylindrical autoclave utilizing a helical agitator of advanced design.

In FIG. 1 a cylindrical autoclave 10, preferably provided with a heat exchange jacket, has a rotary axial shaft 11 which carries inner and outer helical agitator blades 12, 13 pitched in opposite directions, the outer of which closely approaches the wall of the autoclave, being intended not only to stir but to prevent the formation of crusts on the walls. The water jacket, not shown, is supplied at inlet 15 and discharges at 16. The autoclave is charged with monomer through port 17, the product is removed through port 18 at the end of the operation, the unused monomer is evacuated through port 19, and port 20 provides for scavenging air by an inflow of nitrogen.

Figure 2:
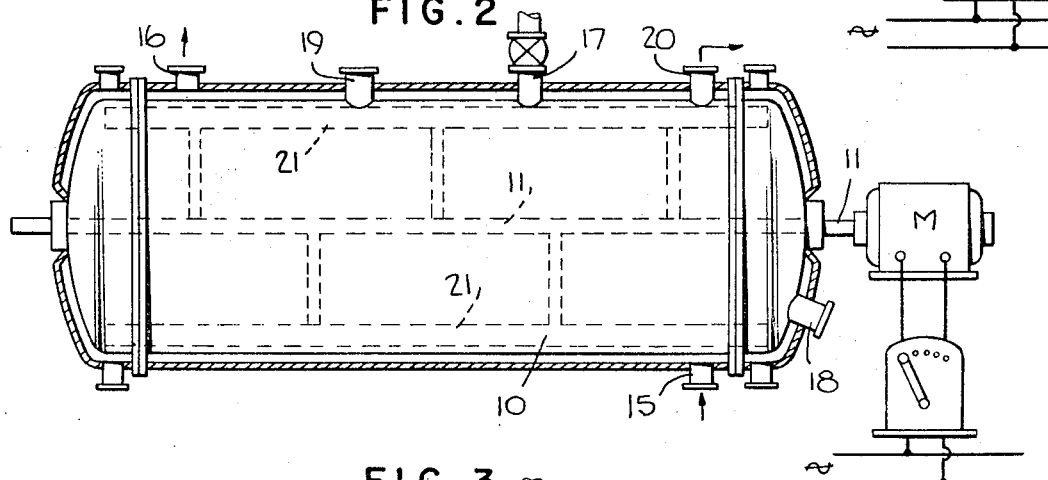
FIG. 2 is a vertical section through a horizontal autoclave utilizing a paddle stirrer of which the blades are as long as the cylinder.

The apparatus of FIG. 2 differs from FIG. 1 in the type of agitator employed, the shaft 11 carrying long blades 21, sometimes two in number mounted on opposite sides of the shaft, closely approaching the wall of the autoclave.

Figure 3:
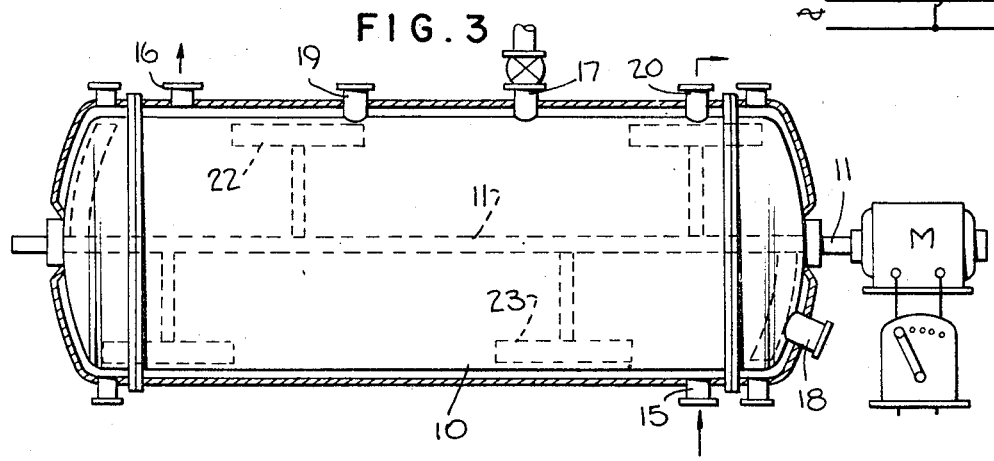
FIG. 3 is a vertical section through a horizontal autoclave which utilizes discontinuous, offset blades.

In FIG. 3 the construction is similar to that of FIG. 2 except that the paddle blades 22, 23 are short and are staggered on opposite sides of shaft 11.

The products of the various old methods differ somewhat but are alike in producing granular polymer, the grains of which vary in size from impalpable dust to 700 microns or more, the grains being of irregular shape, and generally low density.

Granulometry, as used herein, includes the density, the size, and the shape of the grains. It is an object of the invention to improve the granulometry of polymers while employing all the favorable conditions of temperature, pressure, catalysis, and purification known to existing good practice. Another object is to limit the range of grain sizes and to produce denser grains of more regular shape. Another object is to produce more granules in particular sizes and to reduce the percentage of the largest and smallest sizes in each batch. Another object is to make the polymerization in mass more flexible, easier to control, and more efficient, and to improve the homogeneity of the product.

The accomplishment of the objects of the invention has been the more difficult because on the industrial scale agitation has been limited by crust formation and by power needs, especially when the conversion to polymer has become substantial and the reaction mass is a mixture of liquids and solids. The mechanical problems increase greatly and the power consumed by the agitator is objectionable.

The objects of the invention are accomplished generally speaking by polymerizing vinyl chloride in mass within an autoclave equipped with blade type, agitator means movable adjacent the wall of the autoclave, moving the agitator means as rapidly as possible and thereby vigorously agitating the polymerization mass during an early stage of the polymerization, terminating the rapid and vigorous agitation while the polymerization mass contains solid polymer suspended in liquid, thereafter moving the agitator means relatively slowly, for instance at speeds lower than these now considered standard, and thereby gently agitating the polymerization mass until a selected end point has been reached, and isolating the polymer.

According to the present invention, the polymerization, a term which includes both homopolymerization and copolymerization, is carried out during a first stage at a speed of agitation higher than normal but at a speed which is below that at which crusts form on the wall of the autoclave. Generally this speed is in the vicinity of 100 to 130 r.p.m. of the blade type agitators. The higher speed stirring is maintained until 7 to 15%, preferably about 10%, of the monomer has been polymerized, after which the speed of agitation is reduced as far as is consistent with good results, that is to say, to a speed which may be just above that at which unequal heat transfer occurs. Generally, this may be in the neighborhood of 5 r.p.m. According to a modification of the process the first stage of high speed agitation is continued until about 10% polymerization has occurred, the slow agitation is continued until about 40% polymerization has occurred, and the remainder of the polymerization is carried out at an intermediate speed of agitation until the selected end point, for example 70%, has been reached.

The speeds of agitation to be maintained during the different stages of polymerization are related to the size of the apparatus employed and to its mechanical equipment. Substantial variations occur in the optimum conditions of agitation in different types of autoclave, without detracting from the accuracy of what has been stated hereinabove. The principle can be expressed in a ratio from the high speed to the low; thus for a pilot-type autoclave agitated by a blade type stirrer as shown in the drawing, the ratio of high to low speed may be as great at 8:1 or as small as 2:1, whereas in autoclaves of full-scale industrial size having agitators of the same type the maximum ratio might be 6:1 and the minimum 2:1. For example, for an autoclave of 500 liters, supplied with a blade type agitator operating adjacent the cylindrical wall, the high speeds of agitation may advantageously be on the order of 100 to 130 r.p.m. and the slow speed on the order of 30 to 50 r.p.m., whereas for an autoclave having a capacity of 12 m.³ the speed of rapid agitation might be between 26 to 40 r.p.m. while the slow speed would be between 5 and 10 r.p.m.

When the polymerization has reached the selected end point, in general about 70%, the pressure is released, the monomers which had not polymerized are vented and recovered, leaving the product, containing some occluded gas, in the autoclave. The escaping gases are condensed in most cases. To avoid the powdery product from being entrained by the escaping monomer, the agitator is slowly rotated throughout the venting of the gas. This aids in releasing the occluded gases from the polymer. Similarly the agitator is run at slow speed while the polymer is being discharged. In preferred practice, the autoclave is scavenged with nitrogen before the product is removed. The means employed to regulate the speed of the agitator is classic and needs no description. The conditions under which the polymerization proceeds—temperature, pressure and catalysis—are those which are characteristically used in the polymerization in mass of the monomer being polymerized, and need no detailed description.

The invention is equally applicable to autoclaves which have straight blade paddles as indicated in FIGS. 2 and 3. It is a particularly important advantage of the invention that autoclaves equipped with straight blade agitators may be used successfully and produce at equal speeds of rotation, during the first and second stages, polymers of higher apparent density and of more uniform granulometry. For example, an initial speed of 100 r.p.m. in an autoclave of helical agitator type, the monomer being vinyl chloride, produced a polymer of apparent density .51 whereas at equal speeds and under like conditions in an autoclave of the same size, using an agitator according to FIG. 2 of two blades, the apparent density was .56. In both cases the K-wert was 62. The ratios of high to low speed agitation remain the same in both types of autoclave, and the usual conditions of polymerization in mass as to temperature, pressure, and catalysis apply.

I have also discovered that when an agitator is used under like conditions, which has short length, arcuately offset blades as indicated in FIG. 3 of the drawing, for an autoclave having a capacity of 500 liters, the high speeds of agitation of the first stage may be from 100 to 130 r.p.m. and the low speeds of the second stage on the order of 10 to 30 r.p.m. For commercial apparatus of 12 m.³ capacity (type of FIG. 3) the speeds of agitation during the first stage of polymerization may conveniently vary between 35 and 50 r.p.m. and the low speeds between 3 and 10 r.p.m. It is an advantage of this modification that, while the product is fully comparable to that obtained with a blade type agitator of full length, the short length blades require much less power and assist in a more rapid and thorough cleaning of the autoclave during discharge of the product.

The apparatus of FIG. 3 at equal speeds of rotation produces polymers and copolymers of density comparable to the apparatus of FIG. 2, having full length blades while reducing the power required and facilitating the discharge of the polymer. The ratios of high speed to low speeds of agitation during the first and second stages of polymerization remain the same as above described, that is to say, advantageously between 8–1 maximum and 2–1 minimum for a pilot type autoclave and 6–1 maximum and 2–1 minimum for industrial sizes.

A particularly favorable method of carrying out the process provides for accomplishing the polymerization in mass in an autoclave provided with more than one stirrer. According to the invention, the first stage of the polymerization is carried out at the highest possible speed of agitation, the first stage being considered as continuing until about 7 to 12% polymerization of the monomer or monomers has occurred, a high-speed agitator being used, for instance a turbine agitator, this first stage of polymerization being followed by agitating the mixture of monomer and polymer with a slow speed agitator which passes close to the walls of the autoclave, the speed of agitation during this second stage being kept high enough to assure uniform heat exchange within the reaction mass, this stage of polymerization continuing to the selected end point.

Figure 4:
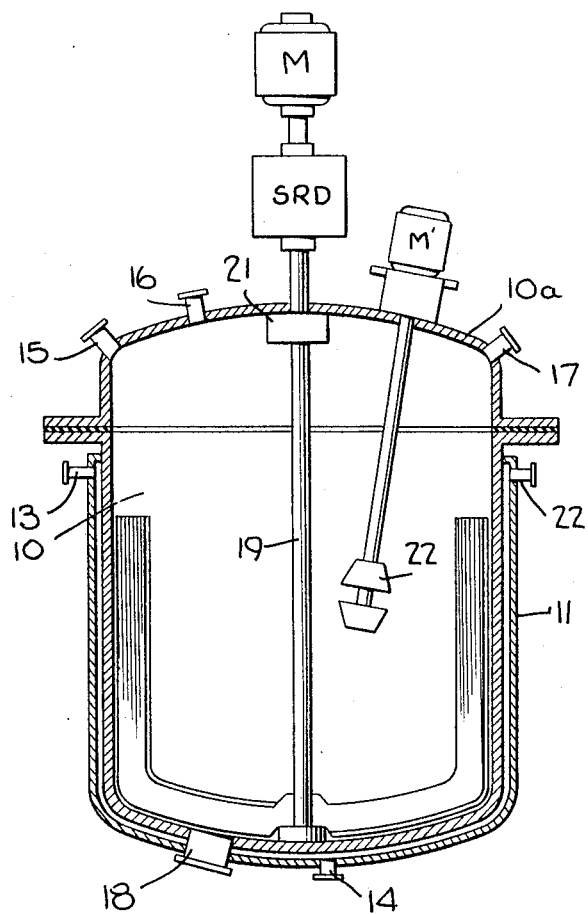
FIG. 4 is a vertical section through a vertical, cylindrical autoclave utilizing a plurality of stirrers.

The high-speed agitation during the first stage of the reaction is produced by means of a turbine type agitator such as the bicone or typhon types which rotate at very high speeds, for example 700 to 1500 r.p.m. The slow agitation which occurs during the second stage is advantageously accomplished by a blade type agitator operating near the wall in order to prevent the formation of deposits. In FIG. 4 there is illustrated an anchor type agitator having a speed range from 5 to 80 r.p.m. These magnitudes are illustrative and can be varied as a function of the characteristics of the apparatus actually employed.

The autoclave may be provided with a high-speed agitator, the position of which within an autoclave can be changed and which may be withdrawn from the reaction mass when it is not in use, thus permitting the use of any type of agitation during the second stage.

It is generally favorable to stop the high-speed agitator when the polymerization has reached about 10%, the slow stirrer remaining inactive until this conversion has been obtained. Both agitators may be used simultaneously during the first stage or they may be used only in sequence, the choice of the method and speed of agitation being effected by the nature of the polymer or copolymers which are being prepared.

It is observed during the first stage of polymerization, while the reaction medium is liquid, that there is a formation of very fine particles of precipitated polymer, which is followed by the formation of granules which remain in suspension in the monomer. The high speed agitation used during the first stage of the polymerization orients the structure of the granules of polymer so that they take a shape which is practically spherical and there is thus produced a final product having great regularity of grains and a high apparent density. In addition to this improvement in the composition of the polymers, the present invention has an additional economic advantage in that the total power necessary for the agitation is substantially less than that which is necessary to produce a polymer which has similar quality in an apparatus provided only with the blade type agitators of the prior art which operate near the walls of the autoclave.

The present invention is advantageous under these circumstances where there is added to the monomer those adjuvants which assist in producing good dispersion; the high speed agitator produces a perfect homogenization of the different ingredients.

The following examples illustrate the invention and demonstrate its superiority in different types of apparatus. In each case the autoclave employed was of cylindrical type having a horizontal axis slightly inclined to the horizontal to assist in the discharge of the product. In the first group of examples the agitator was of helical type, in the second group the agitator was of long blade type, and in the third group it was of short blade, arcuately offset type.

EXAMPLE 1

Prior art

A horizontal cylindrical autoclave of stainless steel of 500 liters capacity provided with an agitator of the helical type described in French Pat. 1,257,780 and illustrated in FIG. 1 received 200 kg. of vinyl chloride monomer and 49 g. (0.022% by weight of the monomer) of azodiisobutyronitrile catalyst. The agitator was turned at 30 r.p.m., the temperature was raised quickly to 62° C., and the pressure was 9.5 kg./cm.² These conditions were maintained throughout the polymerization, which require 13 hours. All other standard methods of carrying out the operation of polymerization in mass were also observed. The temperature was maintained by a flow of water through the water jacket which covered the autoclave. After 13 hours the autoclave was vented and all the monomer which had been polymerized was vaporized and conducted to a condenser line which include a cyclone, and a filter which caught the grains of polymer which were entrained by the escaping gases. The last traces of monomer which had been absorbed by the polymer were extracted by two evacuations of the autoclave under reduced pressure, each of which was followed by scavenging with a current of nitrogen. The discharge hatch of the autoclave was then opened and under the action of the agitator the resin was expelled and conducted to screens by which the sizes of the particles were determined.

The yield was 61% by weight of the monomer of a powder having apparent density of 0.3 and the following distribution of particle sizes. The openings in the screens are expressed in microns and beneath each screen is listed the percentage of granules which passed through. The polymer had a K-wert (Fickensher) of 62 and the grains were of irregular shape.

TABLE I

| Screen (mu): | Percent fallthrough |
| --- | --- |
| 630 | 99 |
| 500 | 98 |
| 400 | 97 |
| 315 | 87 |
| 250 | 76 |
| 200 | 61.5 |
| 160 | 9 |
| 100 | 8 |

EXAMPLE 2

This invention

The apparatus used was identical with that of Example 1 and the conditions were the same except as appears hereinafter.

Into the autoclave of Example 1 were put 200 kg. of vinyl chloride and 32 g. (0.016% by weight of the monomer) of the same catalyst. The agitator was rotated at 130 r.p.m., the temperature was quickly raised to 62° C. and the pressure was 9.5 kg./cm.². After 3 hours of polymerization the speed of the agitator was reduced to 30 r.p.m. and was kept at that speed for the remainder of the polymerization, 12.5 hours. The venting and removal of the polymer were carried out as in Example 1. The yield was 62.5%, the polymer was a powder of apparent density 0.46, the particles of which were more regularly shaped than those of Example 1. When subjected to the same screening the following results were obtained.

TABLE II

| Screen (mu): | Percent fallthrough |
| --- | --- |
| 630 | 99 |
| 500 | 98 |
| 400 | 97 |
| 315 | 96 |
| 250 | 94 |
| 200 | 89 |
| 160 | 51 |
| 100 | 2 |

It is apparent that the density has been substantially increased, which is highly advantageous, and that the percentage of the grains of larger size has been increased and the percentage of the most minute size has been decreased. This is also a substantial advantage.

EXAMPLE 3

Prior art

The autoclave of Example 1 received 200 kg. of vinyl chloride and a mixed catalyst of azodiisobutyronitrile and isopropylperoxydicarbonate in such proportions that there were 0.025% of the azo catalyst (50 g.) and enough peroxy catalyst to give 0.0004% of active oxygen. The speed of rotation of the agitator was 50 r.p.m. from the beginning to the end of polymerization. The temperature was maintained at 56° C. and the pressure at 8 kg./cm.². After 14.5 hours of polymerization the product was isolated as in Example 1 and proved to have an apparent density of 0.35, a yield of 64% irregular granular shape, and the following distribution of particle sizes.

TABLE III

| Screen (mu): | Percent fallthrough |
|---|---|
| 630 | 97 |
| 500 | 97 |
| 400 | 95 |
| 315 | 92 |
| 250 | 47 |
| 200 | 25 |
| 160 | 13 |
| 100 | 2 |

EXAMPLE 4

This invention

Into the same autoclave were put 200 kg. of vinyl chloride monomer and the catalyst mixture of Example 3 yielding 0.02% of azo catalyst based on the monomer weight and enough peroxy catalyst to yield 0.0004% of active oxygen.

The first stage of agitation was carried out at 130 r.p.m. at a temperature of 56° C. and a pressure of 8 kg./cm.$^2$. After 3 hours of polymerization the speed of rotation was reduced to 50 r.p.m. and the reaction continued for 13 hours, a total of 16 hours. The product was isolated as in Example 1, had an apparent density of 0.41, a yield of 61.5% and more regular grains than those of Example 3. The grain sizes, when subjected to screening, were as follows:

TABLE IV

| Screen (mu): | Percent fallthrough |
|---|---|
| 630 | 98 |
| 500 | 96 |
| 400 | 95 |
| 315 | 94 |
| 250 | 92 |
| 200 | 88 |
| 160 | 79 |
| 100 | 6 |

The invention increased the apparent density, produced a narrower band of grain sizes, and improved the shape of the grains.

EXAMPLE 5

Prior art

Into an autoclave of 500 liters capacity provided with a double blade agitator of the type in FIG. 2 were put 200 kg. of vinyl chloride and 32 g. (0.016% of the weight of the monomer) of azodiisobutyronitrile. The speed of the agitation was 30 r.p.m. throughout the process. The temperature was rapidly raised to 62° C. and the pressure to 9.5 kg./cm.$^2$ in the autoclave, the polymerization continuing for 17.5 hours. At the end the product was isolated as in Example 1, the yield was 73.5% of the weight of the monomer, and the product was a powder of unevenly shaped granules of apparent density of 0.49. The distribution of particle sizes is shown in Table V.

TABLE V

| Screen (mu): | Percent fallthrough |
|---|---|
| 630 | 99 |
| 500 | 98 |
| 400 | 97 |
| 315 | 82 |
| 250 | 39 |
| 200 | 21 |
| 160 | 10 |
| 100 | 4 |

EXAMPLE 6

This invention

Into the same autoclave were put the same quantities of ingredients and the conditions of operation were the same except that the agitator was rotated at 100 r.p.m. during the first stage of the polymerization. After 3 hours the speed of the agitator was reduced to 30 r.p.m. and kept at that value for 13 hours, after which the unpolymerized monomer was separated from the polymer as hereinabove described. The yield was 68% of the weight of the monomer and the apparent density of the product was 0.56. The distribution of grain sizes is indicated in Table VI. It will be observed that there is a significant increase in density compared to the product produced at constant agitation under the same conditions, that the granulometry is improved especially in yielding a higher percentage of particles larger than 200 microns, and that the shape of the grains was improved.

TABLE VI

| Screen (mu): | Percent fallthrough |
|---|---|
| 630 | 97 |
| 500 | 95 |
| 400 | 94 |
| 315 | 93 |
| 250 | 87 |
| 200 | 73 |
| 160 | 65 |
| 100 | 0 |

EXAMPLE 7

A horizontal autoclave of the type illustrated in FIG. 2, having a capacity of 12 m.$^3$ received 5,500 kg. of vinyl chloride and 1,210 g. (0.022% of the weight of the monomer) of azodiisobutylronitrile catalyst. The agitator was turned at 40 r.p.m. and the temperature of reaction was raised rapidly to and maintained at 59° C., increasing to a relative pressure of 8.8 kg./cm.$^2$ in the autoclave. After 4 hours 15 minutes of operation it was 10% polymerized and the speed of the agitator was reduced to 10 r.p.m. for 12 hours.

The product was isolated, the yield was 60.5%, the polymer was a powder of K-wert 66, and the apparent density was 0.5. The distribution of grain sizes is shown in Table VII.

TABLE VII

| Screen (mu): | Percent fallthrough |
|---|---|
| 630 | 99 |
| 500 | 99 |
| 400 | 99 |
| 315 | 99 |
| 250 | 94 |
| 200 | 41 |
| 160 | 22 |
| 100 | 8 |

The product had good apparent density and improved granulometry, especially in having a particularly high percentage of particles larger than 250 microns and less than 630 microns.

EXAMPLE 8

In the autoclave of Example 7 there were put 5,500 kg. of vinyl chloride and 750 g. of the same catalyst (0.014% of the weight of the monomer). The speed of agitation was 40 r.p.m. and the temperature was maintained at 62° C., corresponding to 9.5 kg./cm.$^2$. After 3 hours 15 minutes of polymerization the conversion was 7% and the speed of agitation was reduced to 5 r.p.m. which continued for 11 hours and 45 minutes. After isolation of the polymer, as described, the yield was 61.5% of a powder having a K-wert of 62 and an apparent density of 0.55. The distribution of particle sizes is indicated in the table.

TABLE VIII

| Screen (mu): | Percent fallthrough |
|---|---|
| 630 | 98 |
| 500 | 90 |
| 400 | 90 |
| 315 | 88 |
| 250 | 83 |
| 200 | 20 |
| 160 | 8 |
| 100 | 5 |

The improved granulometry was observed as in other cases.

In all cases the regularity of the new grains, as to shape, is improved over that which is obtained by the prior art methods, although they are also somewhat irregular.

EXAMPLE 9

Copolymerization (prior art)

Into a 500 liter autoclave of the type of FIG. 2 were put 160 kg. of vinyl chloride, 10.2 kg. of vinyl acetate (6%), and 37.44 g. of azodiisobutyronitrile were added as catalyst (0.022%). The reaction mass was rapidly carried to 60° C. and the speed of rotation of the agitator was 30 r.p.m. After 11.5 hours of polymerization the product was isolated as hereinabove described. The yield was 70% of a copolymer of apparent density 0.54. The distribution of particle sizes is indicated in Table IX.

TABLE IX

| Screen (mu): | Percent fallthrough |
|---|---|
| 630 | 97 |
| 500 | 95 |
| 400 | 92 |
| 315 | 76 |
| 250 | 67 |
| 200 | 54 |
| 160 | 30 |
| 100 | 5 |

The distribution of particle sizes is widespread. The grains were of irregular shape.

EXAMPLE 10

Copolymerization (this invention)

The autoclave of Example 9 received the same charge of monomers and catalyst. The rotation during the first two hours was at 100 r.p.m. at a temperature of 60° C. Thereafter the agitator was slowed to 30 r.p.m. and polymerization continued for 9 hours. Isolation of the polymer followed as described above, there being recovered 73% of a copolymer of apparent density 0.68 in the particle sizes stated in Table X.

TABLE X

| Screen (mu): | Percent fallthrough |
|---|---|
| 630 | 97 |
| 500 | 92 |
| 400 | 90 |
| 315 | 88 |
| 250 | 87 |
| 200 | 67 |
| 160 | 10 |
| 100 | 1 |

It will be observed that the concentration of sizes is better, that the density is higher, and the yield superior. The shape of the grains was more regular than those produced in Example 9.

EXAMPLE 11

Prior art

The autoclave employed in this example was of the type shown in FIG. 3 which had a capacity of 500 liters and received 200 kg. of vinyl chloride and 32 g. of the azodiiso-catalyst. The speed of the agitator was 30 r.p.m. throughout the polymerization. The reaction temperature was carried to 62° C. and held there to the selected end point. The pressure was 9.5 kg./cm.$^2$ in the autoclave. The polymerization continued 15 hours. Isolation followed by the method recited above and the yield was 60% of a powder polymer having apparent density of 0.41. The granulometry of the polymer obtained is indicated in Table XI.

TABLE XI

| Screen (mu): | Percent fallthrough |
|---|---|
| 630 | 97 |
| 500 | 95 |
| 400 | 75 |
| 315 | 57 |
| 250 | 40 |
| 200 | 23 |
| 160 | 12 |
| 100 | 2 |

EXAMPLE 12

This invention

Under the identical operating conditions of Example 11 the agitator was run for 3 hours at 100 r.p.m.; then the speed was reduced to 30 r.p.m. for 13 hours. The product was then isolated with a yield of 64% of the weight of the monomer and an apparent density of 0.56. The distribution of grain sizes is indicated in Table XII.

TABLE XII

| Screen (mu): | Percent fallthrough |
|---|---|
| 630 | 99 |
| 500 | 99 |
| 400 | 98 |
| 315 | 96 |
| 250 | 95 |
| 200 | 85 |
| 160 | 12 |
| 100 | 1 |

There is a substantial improvement in grain sizes over 200 microns, the density is greater, and the yield is improved. The shape of the grains was more regular.

EXAMPLE 13

Prior art

A vertical type autoclave of stainless steel having a volume of 200 liters was provided only with an anchor stirrer of the type shown in FIG. 4, the speed of which could attain 25 r.p.m. Into this autoclave there were put 100 kg. of vinyl chloride monomer and 15 g. of azodiisobutyronitrile catalyst. The reaction mass was rapidly raised to 62° C., the pressure was 9.5 kg./cm.$^2$, and polymerization was continued with agitation of 25 r.p.m. for 16 hours. The autoclave was vented, put under vacuum twice, swept with nitrogen after each reduction of pressure, and the polymer was discharged, assisted by the stirrer. The yield was 67% (of the weight of the monomer) of a polymer in irregular shaped grains, having an apparent density of 0.35 and the following distribution of sizes:

TABLE XIII

| Screen (mu): | Percent fallthrough |
|---|---|
| 630 | 99 |
| 500 | 94 |
| 400 | 88 |
| 315 | 82 |
| 250 | 68 |
| 200 | 55 |
| 160 | 38 |
| 100 | 12 |

EXAMPLE 14

This invention

The autoclave of Example 13 was also provided with a high speed bicone agitator rotating at 1500 r.p.m. The speed of the anchor agitator was 25 r.p.m. Into this autoclave there were introduced 110 kg. of vinyl chloride monomer and 16 g. (0.0145%) of the same catalyst. At the inception of the operation the high speed agitator was put into action with the slow speed agitator and the temperature of the mass was raised to 62° C. and maintained there throughout the polymerization. At the end of 3 hours there had been a polymerization of 10% of the monomer, the high speed agitator was stopped, and it was withdrawn from the mass. The polymerization continued for 11.5 hours, the anchor stirrer continuing. The product was isolated as in Example 13. It had apparent density of 0.46 and the following distribution of particle sizes:

TABLE XIV

| Screen (mu): | Percent fallthrough |
| --- | --- |
| 630 | 96 |
| 500 | 96 |
| 400 | 94 |
| 315 | 93 |
| 250 | 92 |
| 200 | 91 |
| 160 | 83 |
| 100 | 1 |

The yield was 67%, the same as in Example 13. There was a substantial improvement in the density of the resin. The grains were spherical, and had a larger percentage of sizes lower than 250 microns. Thus, the polymer was of superior granulometry.

EXAMPLE 15

This invention

The conditions were identical with those of Example 14 but the slow agitation was not started until after the rapid agitation had been terminated. The total polymerization was 15.5 hours of which 3 hours of high speed agitation carried the polymerization to 10%. The yield was 68%, the apparent density was 0.43 and the distribution of particle sizes was as follows:

TABLE XIV-A

| Screen (mu): | Percent fallthrough |
| --- | --- |
| 630 | 94 |
| 500 | 92 |
| 400 | 92 |
| 315 | 87 |
| 250 | 85 |
| 200 | 81 |
| 160 | 61 |
| 100 | 1 |

In all the foregoing examples the first stage of polymerization was terminated after a polymerization of about 7 to 12% had been achieved.

This invention produces improvements in all types of apparatus. Among the advantages of the invention are the production of denser grains, of more homogeneous grain sizes, of a condensation of grain sizes to a narrower band, the use of high velocity of agitation without the formation of crusts, the maintenance of the most favorable heat transfer, and a more versatile, controllable and flexible process.

The examples given were drawn to the production of polyvinyl chloride and to its copolymers, but these examples were illustrative and do not constitute a limitation on the generality of what is elsewhere stated. Other advantages of the invention are in the accomplishment of the objects of the invention.

It is to be noted that the range of 7 to 12% polymerization carried out in the first step of the examples is the range of optimum operation for the particular polymers recited but that the optimum range may differ for other monomers.

In the embodiment of FIGS. 5–8, inclusive, the objects are accomplished as to method by the method of polymerizing an ethylenic monomer in mass, the polymer of which is insoluble in the monomer, which comprises partially polymerizing the monomer with vigorous agitation, and continuing the polymerization at a different time and place with relatively mild agitation to a selected end point.

The polymerization is carried out in two stages, in the first of which the monomer, in mass, is subjected to violent agitation, for instance by the use of the type of high speed stirrer operating in the interior of the reaction mass at velocities of hundreds or even over 1000 r.p.m. This period of high speed agitation may continue until circa 7–15% of the monomer has been polymerized, after which the high speed stirring is stopped. During the initial phase of the process the high speed stirring may work alone or may be accompanied by slow speed stirring, e.g. by peripheral stirring, the speed of which is sufficient to maintain good heat exchange with the jacket wall and is below that at which crusts are formed. The high speed agitator may be of turbine type, for example of the types bicone or typhon, and may conveniently rotate between 700–1500 r.p.m. The slow agitator is preferably of blade type and may rotate between 5 and 80 r.p.m., these velocities not being limits. The position of the high speed agitator may be made adjustable if desired. It is satisfactory in most cases to stop the high speed agitator when 10% of the monomer has been polymerized. The first stage is carried out in apparatus apart from the second stage.

During the first phase of the polymerization, when the reaction medium is liquid, there occurs the formation of very fine particles of precipitated polymer and then of polymer granules which remain in suspension in the monomer. The high speed agitation imparts to the product a shape which could not previously be attained, the shape of regular spheres. These grains differ from those of the prior art, which were irregular in shape. Another advantage of the invention is the preparation of grains of density superior to what was previously known. Another advantage is that the total power needed for the agitation is reduced below that which would be necessary to produce the inferior product of the prior art in apparatus equipped with a single agitator of standard, slow speed type. The present invention has another advantage in that the presence of the high speed agitator makes it possible to secure an improved distribution of adjuvants and a perfect homogenization of the ingredients.

The anchor stirrer can be replaced by others of straight blade or of helical type operating near the walls. After the first stage of operation the high speed agitator is withdrawn from the polymerization mass. This can be accomplished in the apparatus of the drawing by drawing the shaft of the stirrer 22 axially upward through the bearing and stuffing box in which it is mounted.

Figure 5:
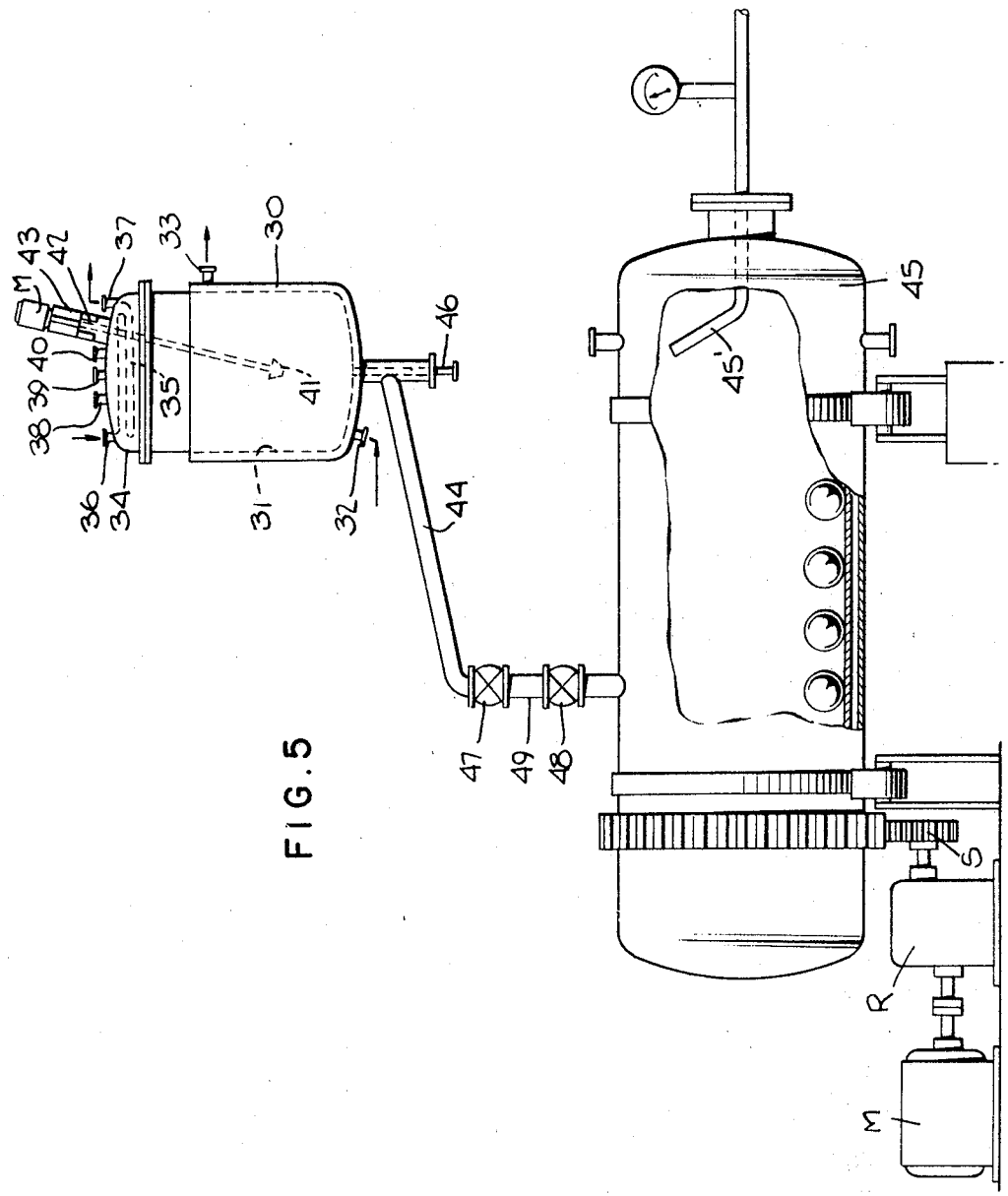
FIG. 5 is an elevational view partly broken away of a novel polymerization apparatus, including a fixed and a rotary autoclave.

In FIG. 5 a prepolymerizer 30 is a vertical type autoclave equipped with a water jacket 31 through which cooling liquid flows from port 32 to port 33. The cover 34 of the autoclave is equipped with a cooling coil 35 which is supplied through ports 36, 37. Ports 38, 39, and 40 allow for the introduction of the monomer and inert gases, the application of a vacuum if need be, and the venting of the autoclave. The cover supports a high speed stirrer 41 which can be vertically raised as desired in a bearing 42, diagrammatically indicated. Apparatus for passing shafts rotatably and for axial motion through the wall of an autoclave is well known and will not be discussed here. Such apparatus is indicated by numeral 43. The motor M which drives the rotor is capable of speeds up to 1500 r.p.m., which is usually adequate.

The prepolymerizer is connected by a conduit 44 to a horizontal autoclave 45 of rotary type. A valve 46 controls the discharge of the polymer under pressure from the prepolymerizer and valves 47, 48 control its admission to the horizontal autoclave 45. When the prepolymerizer has discharged into the autoclave 45, the valves 46, 47, 48 are closed and the connecting conduit 49 is disconnected. The autoclave can then be rotated by means of the motor M, reduction gears R and spur gears S. This autoclave is of known construction and will not be further described. The conditions of polymerization in both autoclaves as to temperature, pressure, and catalysis are according to the good practice of the prior art.

In FIG. 6 the same autoclave 30 serves for the preliminary stage of polymerization and a fixed autoclave 50, which has a slow speed, helical stirrer 51 operating almost in contact with the walls and an internal helical stirrer 52 oppositely pitched to blade 51, is used to complete the polymerization. The outer blades 51, 51' are connected at their ends by blades 53, 53' which operate adjacent the heads 54, 55. The usual ports of supply and discharge are provided and a single valve 56, at the end of conduit 57, provides for the transfer of the partially polymerized reaction mass from the conduit 57 to the autoclave. The stirrer is driven at slow speed by a motor, not shown, which is attached to the shaft 58. Speeds of the stirrer up to 150 r.p.m. may be attained.

In the structure of FIG. 7 the first stage autoclave 30 has a flexible pipe connection 30' between the water jacket 31 and the coil 35. The autoclave 60 has a rotary shaft 58 on which is mounted a blade type stirrer 61 which has two paddles operating near the cylindrical surface. These paddles are driven at slow speed by a driving motor and gears of a type adapted to produce rotations up to about 150 r.p.m.

In FIG. 8 the autoclave 70 is connected to autoclave 30 as in FIG. 7 but the autoclave is equipped with short-length blades 71, 72 which are connected to the shaft 58 in opposed, staggered relation. Shaft 58 also carries oppositely directed blades 73, 74 which agitates the polymerization mass adjacent the heads of the autoclave. The driving mechanism is the same as for the other horizontal types.

This invention permits one to produce powdery polymers from ethylenic monomers is mass with higher density, better granulometry, and more nearly equal size than was possible in the prior art. A particular advantage is the preparation of such grains in the form of regular spheres as distinguished from the irregular shapes produced by the prior art. By altering the speeds of agitation in the prepolymerizer the mean dimensions of the grains in the final product may be changed at will while maintaining an apparent density superior to that which could be produced by prior art means. For example, all other conditions being kept constant, one may establish the mean diameter of the grains of the final product from 300 to 90 microns by changing the speed of agitation in the prepolymerizer. The speeds of rotation are generally between 500 and 1500 r.p.m. when the monomer is vinyl chloride.

At the beginning of the operating cycle the prepolymerizer is charged with monomer and catalyst under conditions characteristic of the good practice of the prior art. A small portion of the monomer is released to scavenge the air in the prepolymerizer. The speeds of rotation of the typhon type agitator and the temperature of the fluid in the water jacket are established as a function of the quality of a product which is to be obtained. When one attains the prepolymerization end point, for example 10%, the prepolymerizer is attached to one or another of the horizontal autoclaves similar to 45, 50, 60, or 70, as the case may be, the transfer being carried out advantageously by gravity, the pressures in the two autoclaves being substantially the same. If desired, a slight over-pressure can be maintained in the prepolymerizer to speed up the rate of transfer. For the purpose of this general description it may be assumed that 10% polymerization has occurred in the prepolymerizer. Polymerization is then carried out in the second autoclave until the final end point is reached (in the case of polyvinyl chloride this may be around 70% of the weight of the monomer) after which the usual operations of venting, recovery of monomer, evacuation, scavenging with nitrogen and discharge of the polymer are carried out according to prior art methods as employed in connection with such apparatus. The following examples illustrate this part of the invention.

EXAMPLE 16

A prepolymerizer of vertical type of 200 liters capacity made of stainless steel and provided with a bicone stirrer 80 mm. in diameter received 170 kg. of vinyl chloride and 27.2 g. (0.016%) of azodiisobutyronitrile catalyst. The agitator was driven at 1420 r.p.m. while the reaction conditions were maintained at 62° C. (9.5 kg./cm.$^2$) for 3 hours after which the mixture of monomer and polymer was transferred by gravity through a tube of stainless steel having an internal diameter of 50 mm. to a stainless steel autoclave of 500 liters capacity of the type illustrated in FIG. 6. The speed of agitation of the helical agitator was 8 r.p.m. Before the transfer the second autoclave had been purged of oxygen by the vaporization of 20 kg. of monomer. The temperature of the water in the jacket of the second autoclave was maintained at 50° C. at the moment of transfer, which required less than a minute. When this had been achieved the communication between the two autoclaves was cut off by a valve and the temperature rose rapidly to 62° C. The polymerization was then continued slowly for 15 hours, for a total of 18 hours. The unreacted monomer was then vented and recovered in a condensation circuit containing a cyclone, and a filter to catch the entrained polymer grains. The remaining traces of monomer in the polymer were eliminated by two evacuations followed by the passage of nitrogen, after which the discharge hatch was opened and the product was screened. The yield was 65.8% with respect to the weight of the monomer employed, the K-wert was 62, the apparent density 0.54, the shape of the grains spherical, and the distribution of grain sizes as set forth in the table.

TABLE XV

| Screen apertures (mu): | Percent fallthrough |
| --- | --- |
| 630 | 99 |
| 500 | 99 |
| 400 | 98 |
| 315 | 95 |
| 250 | 94 |
| 200 | 81 |
| 160 | 15 |
| 100 | 0 |

It is observed that the granulometry of the particles is better, the spread of sizes is reduced, and that the number of grains less than 200 microns in diameter are greatly reduced compared to the granulometry of polymer prepared by the prior art method.

EXAMPLE 17

The prepolymerizer was as described in Example 16, it received 160 kg. of vinyl chloride (94%), 10.2 kg. of vinyl acetate (6%), and 37.44 g. of azodiisobutyronitrile catalyst (0.022%) of the combined weight of the monomers. The turbine was rotated at 700 r.p.m., the temperature was held at 60° C. and after 2 hours 15 minutes of polymerization the mass was transferred to the second autoclave, which was of 500 liters capacity and of the type shown in FIG. 6. The helical rotators were rotated at 30 r.p.m. After 9 hours of polymerization in the slow speed autoclave the product was isolated as described in Example 16, the yield was 64% of a copolymer having an apparent density of 0.68 of spherical granules practically all of which were between 100 and 200 microns in diameter the size distribution of which is indicated in Table XVI.

TABLE XVI

| Screen (mu): | Percent fallthrough |
|---|---|
| 600 | 97 |
| 500 | 95 |
| 400 | 94 |
| 315 | 93 |
| 250 | 93 |
| 200 | 91 |
| 160 | 38 |
| 100 | 1 |

The shape of the granules was better, the spread of sizes was less, and the density was much improved over products known to the prior art when produced under like conditions of polymerization in a single autoclave in which the same stirrer operated through at 30 r.p.m.

EXAMPLE 18

Prior art

This process was carried out in a horizontal autoclave of the type shown in FIG. 5. The agitators were spheres which rolled along the bottom of the rotating cylinder. The capacity of the autoclave was 200 liters, there were 18 balls 90 mm. in diameter each weighing 3 kg., 60 kg. of vinyl chloride were introduced and 9.6 g. (0.016% of the weight of the monomer) of azodiisobutyronitrile catalyst. The autoclave was driven at 12 r.p.m., the temperature was raised rapidly to 62° C. (9.5 kg./cm.$^2$) and maintained at that temperature for the 16 hours of the polymerization. The speed of rotation was then reduced to 4 r.p.m. to assist in venting the gases, which was carried out as hereinabove described. After venting, the polymer was discharged. It had a K-wert of 62, an apparent density of 0.32, and a yield of 75.8%. The grains were irregular in shape and distributed by sizes as shown in the table.

TABLE XVII

| Screen (mu): | Percent fallthrough |
|---|---|
| 630 | 91 |
| 500 | 84 |
| 400 | 75 |
| 315 | 70 |
| 250 | 57 |
| 200 | 46 |
| 160 | 34 |
| 100 | 12 |

There was wide distribution of grain sizes, and the particles were quite irregular and fragmented.

The processes of the prior art, when applied in a single step polymerization, generally produce apparent densities between 0.3 and 0.4 for homopolymers, and grains of irregular and frequently fragmented shape. The sphericity and high density of the products produced by the present invention are not produced in prior art autoclaves, regardless of their type or mode of agitation.

EXAMPLE 19

The process of Example 18 was carried out in the apparatus of FIG. 5, the monomer being first admitted to the vertical type autoclave 30 where a bicone stirrer, 80 mm. in diameter, rotating at 1420 r.p.m., acted on 100 kg. of vinyl chloride and 18 g. (0.018%) of the same catalyst. The temperature was maintained at 62° C. (9.5 kg./cm.$^2$) for 3 hours, producing a mixture of polymer suspended in monomer. This was flowed by gravity to the horizontal autoclave of Example 18. After the transfer, which took one minute, the valve 48 was closed and the pipe 49 was uncoupled. The autoclave was then rotated at 12 r.p.m. for 15 hours under the same conditions of temperature and pressure. At the end point the speed was reduced to 4 r.p.m., the unreacted gases were scavenged through the tube 45′, and the autoclave was scavenged with nitrogen and stopped for discharge. The yield was 74% of a powder of apparent density 0.56, a K-wert of 62, the particles of which were spherical. The particle sizes were distributed as shown in the table.

TABLE XVIII

| Screen (mu): | Percent fallthrough |
|---|---|
| 630 | 99 |
| 500 | 98 |
| 400 | 98 |
| 315 | 97 |
| 250 | 97 |
| 200 | 89 |
| 160 | 48 |
| 100 | 1 |

The granulometry of the particles was better, yielding a very high percentage between 100 and 200 microns in size, only 11% were larger and only 1% was smaller. This sphericity and uniformity have never before been achieved.

EXAMPLE 20

Into the same prepolymerizer were put 100 kg. of vinyl chloride monomer and 18 g. (0.018%) of the same catalyst. The same agitator was rotated at 710 r.p.m. for 3 hours at 62° C. and 9.5 kg./cm.$^2$ pressure. At the 3 hour end point the mixture of monomer and polymer was transferred to the horizontal autoclave of FIG. 5 and the ploymerization was continued for 11.5 hours. Isolation of the polymer showed a yield of 73%, of apparent density 0.5, K-wert of 62 in spherical grains, the size distribution of which is shown in the table.

TABLE XIX

| Screen (mu): | Percent fallthrough |
|---|---|
| 630 | 98 |
| 500 | 95 |
| 400 | 90 |
| 315 | 55 |
| 250 | 28 |
| 200 | 6 |
| 160 | 2 |
| 100 | 0.5 |

The majority of the grains were in the range of sizes between 250 and 400, only 10% being larger and only 28% being smaller and only 6% were less than 200 microns. This is one of the example which shows the effect that can be achieved by the use of different speeds of rotation on the granulometry of the product.

EXAMPLE 21

In the apparatus of FIG. 5 the bicone agitators were replaced by a turbine 160 mm. in diameter which was driven at 710 r.p.m., the conditions were otherwise identical with those of Example 20 except that the polymerization in the horizontal autoclave was continued for 17 hours. The isolated product had a K-wert of 62, apparent density of 0.56, and the yield was 77%. The grains were spherical and the size distribution is shown in the table.

TABLE XX

| Screen (mu): | Percent fallthrough |
|---|---|
| 630 | 98 |
| 500 | 97 |
| 400 | 97 |
| 315 | 95 |
| 250 | 95 |
| 200 | 88 |
| 160 | 49 |
| 100 | 0 |

The density was greater than in Example 20, and 88% of the grains were between 100 and 200 microns in diameter, none being smaller than 100 microns and only 12% larger.

EXAMPLE 22

Prior art

A horizontal autoclave of 200 liters capacity containing 18 balls 90 mm. in diameter of stainless steel each weighing 3 kg. was purged by evaporation of 5 kg. of vinyl chloride and received 57 kg. of vinyl chloride, 3 kg. of vinyl acetate and 0.023% of azodiisobutylronitrile catalyst. The speed of rotation of the autoclave was 12 r.p.m., pressure was 9.5 kg./cm.$^2$, the temperature was 62° C. and polymerization continued 14 hours. On isolation by classic methods the yield was 75% of a copolymer having an apparent density of 0.59, an apparent density of 0.51, the distribution of grain sizes being as follows:

TABLE XXI

| Screen (mu): | Percent fallthrough |
|---|---|
| 630 | 87 |
| 500 | 83 |
| 400 | 77 |
| 315 | 70 |
| 250 | 64 |
| 200 | 54 |
| 160 | 43 |
| 100 | 22 |

The distribution of grain sizes was wide and the particles were of irregular shape.

EXAMPLE 23

A 200 liter prepolymerizer provided with a turbine agitator of the type called typhon of 160 mm. diameter received 100 kg. of vinyl chloride, 5 kg. of vinyl acetate and 23 g. of the same catalyst (0.023% of the weight of the mixed monomers). The temperature was established at 62° C., the pressure at 9.5 kg./cm.$^2$ and prepolymerization was carried out for 2.5 hours at 700 r.p.m. The transformation at this intermediate end point was 8.7%. The mixture of monomers and polymer was then transferred to the rotary horizontal autoclave of FIG. 5, the operating conditions being the same as in the prepolymerizer except for speed of agitation. The polymerization continued for 11.5 hours at 12 r.p.m., making a total polymerization time of 14 hours, during which the pressure fell from 9.5 to 9.2 kg./cm.$^2$. The yield was 70% of a copolymer having apparent density of 0.64, the apparent density of the finest particles being 0.62; the distribution of grain sizes was as follows:

TABLE XXII

| Screen (mu): | Percent fallthrough |
|---|---|
| 630 | 96 |
| 500 | 94 |
| 400 | 92 |
| 315 | 91 |
| 250 | 90 |
| 200 | 88 |
| 160 | 68 |
| 100 | 1 |

The grains of copolymer were spherical and the regularity of the sizes was much improved over what could be obtained in the rotary autoclave alone.

EXAMPLE 24

Prior art

The autoclave used was the horizontal autoclave of FIG. 7. It had a capacity of 500 liters and an agitator of 2 blades. It received 200 kg. of vinyl chloride monomer and 32 g. of the catalyst azodiisobutyronitrile. The agitator was rotated at 30 r.p.m. The temperature was 62° C. and the pressure 9.5 kg./cm.$^2$. The autoclave had a water jacket through which water circulated. Polymerization continued for 17.5 hours and the product was isolated. The yield was 73.5% of the weight of the monomer, and the K-wert was 62 and the apparent density 0.49. The distribution of grain sizes was as shown in the table.

TABLE XXIII

| Screen (mu): | Percent fallthrough |
|---|---|
| 630 | 99 |
| 500 | 98 |
| 400 | 97 |
| 315 | 82 |
| 250 | 39 |
| 200 | 21 |
| 160 | 10 |
| 100 | 4 |

The particles were of irregular shape.

EXAMPLE 25

Using the two step process and the apparatus of FIG. 7, the prepolymerizer being of 200 liters capacity agitated by a bicone 80 mm. in diameter. 170 kg. of vinyl chloride and 27.2 g. of the same catalyst were added. The agitation was at 1420 r.p.m. at a temperature of 62° C. and a pressure of 9.5 kg./cm.$^2$. Polymerization was for 3 hours, after which the mixture of polymer and monomer was transferred to the horizontal autoclave, the paddles of which were driven at 30 r.p.m. Polymerization was continued under the same conditions of temperature and pressure for 12 hours 45 minutes. After isolation of the polymer the yield was 69.6%, the K-wert was 62, the particles spherical, and the distribution of sizes as shown in the table:

TABLE XXIV

| Screen (mu): | Percent fallthrough |
|---|---|
| 630 | 99 |
| 500 | 98 |
| 400 | 98 |
| 315 | 97 |
| 250 | 95 |
| 200 | 88 |
| 160 | 32 |
| 100 | 0.5 |

The same superiority of granulometry exists as in the other cases.

EXAMPLE 26

Into the apparatus of Example 25 were put 160 kg. of vinyl chloride and 10.2 kg. of vinyl acetate and 37.44 g. of the same catalyst. The speed of rotation in the prepolymerizer was 700 r.p.m. and the temperature 60° C. After 2 hours 15 minutes the mix was transferred to the large autoclave and polymerization continued at 30 r.p.m. After 7 hours 15 minutes of polymerization in the large autoclave the product was isolated; the yield was 62%, the density 0.68, the granules were spherical and the size distribution as shown in the table:

TABLE XXV

| Screen (mu): | Percent fallthrough |
|---|---|
| 630 | 98 |
| 500 | 97 |
| 400 | 96 |
| 315 | 95 |
| 250 | 94 |
| 200 | 92 |
| 160 | 62 |
| 100 | 1 |

EXAMPLE 27

The apparatus used was of the type shown in FIG. 8. The prepolymerizer was of 200 liters capacity equipped with a typhon turbine 180 mm. in diameter driven at 710 r.p.m. 170 kg. of vinyl chloride and 0.018% of the azodiisobutyronitrile catalyst were added. The temperature was established at 62° C. and 9.5 kg./cm.$^2$ pressure. After 2 hours in the vertical autoclave the mass was transferred to the 500 liter horizontal autoclave, the paddles of which were equipped with scrapers that touched the wall. Cooling was maintained by flowing water through the water jacket. The speed of rotation was 8 r.p.m. The polymerization continued for 14 hours at 62° C. The polymer was isolated. The yield was 72.6%, the K-wert 62, the apparent density 0.58, the particles were spherical and the distribution of sizes was an shown in the table:

TABLE XXVI

| Screen (mu): | Percent fallthrough |
|---|---|
| 630 | 99.5 |
| 500 | 99 |
| 400 | 98 |
| 315 | 96 |
| 250 | 96 |
| 200 | 84.5 |
| 160 | 27 |
| 100 | 1 |

The specific examples have been limited to a limited number of polymers and copolymers, but it must be remembered that the examples are for purposes of illustration only and do not limit the generality of what is elsewhere stated or claimed.

The advantages of the invention are in new products of superior shape and superior uniformity, higher density, freer of dust. The process is novel, adds great flexibility to the preparation of polymers and makes it possible to produce different grain sizes at will. Furthermore, the consumption of power is less than is otherwise required despite the use of high speed agitation. This process will produce a superior form of polymer, in more uniform sizes, in sizes chosen at will, and in size distributions which largely eliminate screening. The objects of the invention have been accomplished and that accomplishment has been attended with great advantages.

As many apparently widely different embodiments of the present invention may be made without departing from the spirit and scope thereof, it is to be understood that the invention is not limited to the specific embodiments.

I claim:

1. The method of increasing the density of the grains produced by the polymerization of vinyl chloride in mass, of producing such grains as spheres, and of producing them with improved granulometry, which comprises polymerizing vinyl chloride monomer in mass in a plurality of stages under similar conditions of pressure, temperature, and catalysis, a prior stage proceeding to about 7–12% completion of polymerization accompanied by agitation of high turbulence internally applied to the monomeric fluid, and a final stage proceeding in the absence of high turbulence to a selected end point of polymerization at which the bulk of the product is in grains of at least 100 microns in size, with relatively mild agitation peripherally applied to the polymer-containing mass.

2. In a method of polymerization wherein a selected quantity of fluid monomer, the polymer of which is insoluble in the monomer, is subjected in mass to conditions of temperature, pressure, and catalysis favorable to polymerization until a selected end point has been attained, the steps of subjecting substantially all of a quantity of monomeric fluid comprising vinyl chloride to agitation of very high turbulence until about 7–15% of the monomer has been polymerized as very fine particles of polymer, eliminating the high turbulence, and continuing the polymerization with relatively mild agitation until an end point has been reached at which the bulk of the product is in grains of at least 100 microns in size, the final stage of agitation being at speeds above but adjacent those at which temperature control of the reaction mass is impaired.

3. The method of claim 2 in which the temperature control of the reaction mass is peripheral, and the said subsequent step of mild agitation is peripherally applied in the lowest levels of speed which produce good temperature control within the reaction mass.

4. The method of claim 2 in which the turbulent agitation is applied centrally of the reaction mass and the mild agitation is applied peripherally.

5. The method of claim 2 in which the period of mild agitation and low turbulence is followed by agitation at turbulence and speeds intermediate those of the said periods of high turbulence and low turbulence.

6. The method of preparing polyvinyl chloride and its copolymers which comprises putting vinyl chloride in mass under conditions of temperature, pressure and catalysis favorable to polymerization, agitating the vinyl chloride with highly turbulent agitation until about 7 to 15% polymerization has occurred, transferring the polymerization mass to another place, and applying agitation, of relatively low turbulence, adequate to temperature control, while continuing the polymerization to an end point at least about 60% conversion ot polymer under conditions of temperature, pressure and catalysis favorable to polymerization, ending the polymerization, and isolating the product.

7. The method of claim 6 in which the highly turbulent agitation is internal and the low speed agitation is peripheral.

8. A method of producing polymers of vinyl chloride in mass in spherical granules which comprises partially polymerizing the liquid monomer, to the formation of tiny spherical particles in suspension in liquid monomer, with turbulent agitation applied centrally of the polymerization mass, terminating the high speed impulsion before substantially more than 15% of the polymerization has been completed, transferring the liquid suspension of polymer in monomer to other apparatus, developing the particles in size by continuing the polymerization in mass with broadly applied and relatively mild agitation of low turbulence until a selected end point of particles size has been reached at which the spherical grains are not substantially below 100 microns nor substantially above 630 microns in size, both stages of polymerization being carried out with continuous and substantial stabilization of temperature in the polymerization mass and with pressure adequate to the maintenance of a liquid phase of vinyl chloride, and separating the polymer from the liquid phase.

9. The method of claim 8 in which high speed impulsion is applied only to a small volume of the liquid monomer centrally located in a liquid mass, generating a stream which flows through the liquid into contact with cooling means and thence back to the place of impulsion.

References Cited

UNITED STATES PATENTS

| 2,715,117 | 8/1955 | Baeyaert | 260—92.8 |
| 2,981,724 | 4/1961 | Holdsworth. | |
| 3,057,831 | 10/1962 | Holdsworth. | |
| 3,007,903 | 11/1961 | Stark. | |
| 2,600,695 | 6/1952 | Sans | 260—92.8 |

FOREIGN PATENTS

| 1,257,780 | 2/1961 | France. |

JOSEPH L. SCHOFER, Primary Examiner

J. A. DONAHUE, Jr., Assistant Examiner

U.S. Cl. X.R.

260—87.1

PO-1050
(5/69)

UNITED STATES PATENT OFFICE
CERTIFICATE OF CORRECTION

Patent No. 3,522,227          Dated July 28, 1970

Inventor(s) JEAN CLAUDE THOMAS

It is certified that error appears in the above-identified patent and that said Letters Patent are hereby corrected as shown below:

Column 1, line 10, after "926,043" insert -- ; Mar. 1, 1963, 926,457; Apr. 1, 1963, 929,992; Apr. 2, 1963, 930,109; Apr. 26, 1963, 932,756; May 2, 1963, 933,439; Sept. 27, 1963, 948,908; Sept. 30, 1963, 949,093 --.

SIGNED AND
SEALED
DEC 8 1970

(SEAL)
Attest:

Edward M. Fletcher, Jr.
Attesting Officer

WILLIAM E. SCHUYLER, JR.
Commissioner of Patents